(12) United States Patent  
Kang et al.

(10) Patent No.: US 11,644,928 B2
(45) Date of Patent: May 9, 2023

(54) DISPLAY APPARATUS AND CONTROL METHOD THEREOF

(71) Applicant: SAMSUNG ELECTRONICS CO., LTD., Suwon-si (KR)

(72) Inventors: Kunsok Kang, Suwon-si (KR); Byungseok Soh, Suwon-si (KR); Seungil Yoon, Suwon-si (KR); Eungsik Yoon, Suwon-si (KR); Suhwan Jin, Suwon-si (KR); Taedon Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/017,782

(22) Filed: Sep. 11, 2020

(65) Prior Publication Data

US 2021/0294455 A1 Sep. 23, 2021

(30) Foreign Application Priority Data

Mar. 23, 2020 (KR) .................. 10-2020-0035101

(51) Int. Cl.
*G06F 3/042* (2006.01)
*G09G 3/20* (2006.01)
*F16M 11/10* (2006.01)
*H04N 21/4223* (2011.01)

(52) U.S. Cl.
CPC ......... *G06F 3/0425* (2013.01); *F16M 11/105* (2013.01); *G09G 3/20* (2013.01); *H04N 21/4223* (2013.01); *G09G 2340/0492* (2013.01)

(58) Field of Classification Search
CPC . G06F 3/0425; G09G 3/20; G09G 2340/0492
See application file for complete search history.

(56) References Cited

U.S. PATENT DOCUMENTS

| 9,007,352 B2 | 4/2015 | Senatori |
| 9,294,761 B2 | 3/2016 | Lee et al. |
| 9,628,744 B2 | 4/2017 | Phang et al. |
| 10,567,630 B2 | 2/2020 | Hawthorne et al. |

(Continued)

FOREIGN PATENT DOCUMENTS

| JP | 2004-193860 A | 7/2004 |
| JP | 2010-141735 A | 6/2010 |

(Continued)

OTHER PUBLICATIONS

Communication dated Apr. 13, 2021, from the European Patent Office in European Application No. 20202096.2.

(Continued)

*Primary Examiner* — Grace Q Li
(74) *Attorney, Agent, or Firm* — Sughrue Mion, PLLC

(57) ABSTRACT

A display apparatus and a control method thereof are provided. The display apparatus includes a display configured to be rotatable; a plurality of cameras; and a processor configured to: based on the display being oriented in a vertical direction, control one camera of the plurality of cameras to perform photographing; and based on a user command being received while the one camera is performing photographing, rotate the display to be oriented in a horizontal direction and control the one camera to stop photographing.

16 Claims, 19 Drawing Sheets

(56) References Cited

U.S. PATENT DOCUMENTS

| | | | |
|---|---|---|---|
| 11,006,030 B2 | 5/2021 | Lee et al. | |
| 11,019,388 B2* | 5/2021 | Choi | H04N 21/4122 |
| 2006/0274155 A1 | 12/2006 | Kim et al. | |
| 2010/0295782 A1* | 11/2010 | Binder | G09G 5/10 |
| | | | 345/158 |
| 2013/0147731 A1* | 6/2013 | Adachi | G06F 3/04845 |
| | | | 345/173 |
| 2013/0176341 A1 | 7/2013 | Jung et al. | |
| 2015/0311941 A1* | 10/2015 | Sorrentino | H04B 1/3888 |
| | | | 455/575.8 |
| 2017/0111570 A1 | 4/2017 | Yoon et al. | |
| 2018/0007280 A1* | 1/2018 | Case, Jr. | H04N 5/23293 |
| 2018/0332205 A1 | 11/2018 | Hawthorne et al. | |
| 2019/0073041 A1* | 3/2019 | Zhang | G06K 9/00355 |
| 2019/0244376 A1* | 8/2019 | Choi | G06F 3/017 |
| 2019/0260863 A1 | 8/2019 | Kinouchi | |
| 2020/0244854 A1 | 7/2020 | Lee et al. | |
| 2021/0168300 A1* | 6/2021 | Wang | H04N 5/232935 |

FOREIGN PATENT DOCUMENTS

| | | |
|---|---|---|
| JP | 5534166 B2 | 6/2014 |
| JP | 2019-153049 A | 9/2019 |
| KR | 10-2008-0067464 A | 7/2008 |
| KR | 10-2013-0087886 A | 8/2013 |
| KR | 10-2014-0133363 A | 11/2014 |
| KR | 10-1598926 B1 | 3/2016 |
| KR | 10-1881525 B1 | 7/2018 |
| KR | 10-2019-0017113 A | 2/2019 |
| KR | 10-2019-0141866 A | 12/2019 |

OTHER PUBLICATIONS

Communication dated Dec. 15, 2020, issued by the International Searching Authority in counterpart International Application No. PCT/KR2020/012160 (PCT/ISA/210 and 237).

* cited by examiner

DISPLAY APPARATUS AND CONTROL METHOD THEREOF

CROSS-REFERENCE TO RELATED APPLICATION(S)

This application is based on and claims priority under 35 U.S.C. § 119 to Korean Patent Application No. 10-2020-0035101, filed on Mar. 23, 2020, in the Korean Intellectual Property Office, the disclosure of which is incorporated by reference herein in its entirety.

BACKGROUND

1. Field

The disclosure relates to a display apparatus and a control method thereof, and more particularly, to a display apparatus which includes a rotatable display and a control method thereof.

2. Description of Related Art

Recently, with the development of electronic technologies, various electronic apparatuses are being developed, and in particular, a display apparatus including a rotatable display has been developed.

With the rotatable display apparatus, a user may arrange a display in a horizontal or a vertical direction, and be provided with images at various angles at which the user wants to view the images.

However, if a camera is disposed on top of the rotatable display apparatus, the photographing direction of the camera of the display apparatus may also be changed. For example, as the photographing direction of the camera faces upward, there is a problem that a user located in the front of the display apparatus cannot be photographed correctly by the camera.

SUMMARY

Provided are a display apparatus that can control photographing direction of a camera according to a direction of a display, and a control method thereof.

Additional aspects will be set forth in part in the description which follows, and in part, will be apparent from the description, or may be learned by practice of the presented embodiments.

In accordance with an aspect of the disclosure, there is provided a display apparatus including: a display configured to be rotatable; a plurality of cameras; and a processor configured to: based on the display being oriented in a vertical direction, control one camera of the plurality of cameras to perform photographing; and based on a user command being received while the one camera is performing photographing, rotate the display to be oriented in a horizontal direction and control the one camera to stop photographing.

The plurality of cameras include a first camera and a second camera, the second camera having an angle of view that is greater than an angle of view of the first camera, and the processor is further configured to: based on the display being oriented in the vertical direction, control the first camera to perform photographing; and based on the user command being received, control the first camera to stop photographing, rotate the display to be oriented in the horizontal direction and control the second camera to perform photographing.

The processor is further configured to: identify an object included in a first image captured by the first camera and identify the object included in a second image captured by the second camera, and based on identifying the object in both the first image and the second image, control the display to display the second image such that the object is displayed in a center area of the display oriented in the horizontal direction.

The processor is further configured to, based on the user command being received, rotate the display to be oriented in the horizontal direction and drive the camera cover to cover the plurality of cameras.

The display apparatus further including a sensor. The processor is further configured to: identify a tilting angle of the display based on sensing data obtained from the sensor while the display is oriented in the vertical direction, and rotate a first photographing angle of the first camera based on the tilting angle.

The processor is further configured to rotate the first photographing angle of the first camera in a lower direction by the tilting angle.

The processor is further configured to: based on the display rotating to be oriented in the horizontal direction according to the user command, identify the tilting angle of the display based on the sensing data received from the sensor, and rotate a second photographing angle of the second camera based on the tilting angle.

In accordance with an aspect of the disclosure, there is provided a control method of a display apparatus including a rotatable display. The method includes: based on the display being oriented in a vertical direction, controlling one camera of a plurality of cameras included in the display apparatus to perform photographing; and based on a user command being received while the one camera is performing photographing, rotating the display to be oriented in a horizontal direction and controlling the one camera to stop photographing.

The plurality of cameras include a first camera and a second camera, the second camera having an angle of view that is greater than an angle of view of the first camera, and based on the display being oriented in the vertical direction, controlling the first camera to perform photographing, and based on the user command being received, controlling the first camera to stop photographing, rotating the display to be oriented in the horizontal direction and controlling the second camera to perform photographing.

The control method further includes: identifying an object included in a first image captured by the first camera and identifying the object included in the second image captured by the second camera; and based on identifying the object in both the first image and the second image, controlling the display to displaying the second image such that the object is displayed in a center area of the display oriented in the horizontal direction.

The control method further includes: based on the user command being received, rotating the display to be oriented in the horizontal direction and driving the camera cover to cover the plurality of cameras.

The control method further includes: identifying, by a sensor, a tilting angle of the display based on sensing data obtained from the sensor while the display is oriented in the vertical direction; and rotating a first photographing angle of the first camera based on the tilting angle.

The rotating the first photographing angle of the first camera further includes: rotating the first photographing angle of the first camera in a lower direction by the tiling angle.

The control method further includes: based on the display rotating to be oriented in the horizontal direction according to the user command, identifying the tilting angle of the display based on the sensing data received from the sensor; and rotating a second photographing angle of the second camera based on the tilting angle.

The user command includes at least one of a user input for rotating the display or a user input for controlling the display to display a broadcasting signal received from an external device.

The tiling angle is an angle between a surface of the display and a plane perpendicular to a ground.

The display apparatus further includes a motor configured to rotate the display in the vertical direction and the horizontal direction.

The processor is further configured to rotate the display based on a function being executed by the display.

The function includes at least one of a video call, a broadcasting, or a gaming.

In accordance with an aspect of the disclosure, there is provided a display apparatus including: a display configured to be rotatable; a plurality of cameras; and a processor configured to: based on the display being in a first orientation, control a first camera of the plurality of cameras to perform photographing; and based on a user command being received while the first camera is performing photographing, control the first camera to stop photographing, rotate the display to be in a second orientation, and control the second camera to perform photographing when the display is oriented in the second orientation.

BRIEF DESCRIPTION OF THE DRAWINGS

The above and other aspects, features and advantages of certain embodiments will become more apparent from the following description, taken in conjunction with the accompanying drawings, in which.

DETAILED DESCRIPTION

Figure 1A:
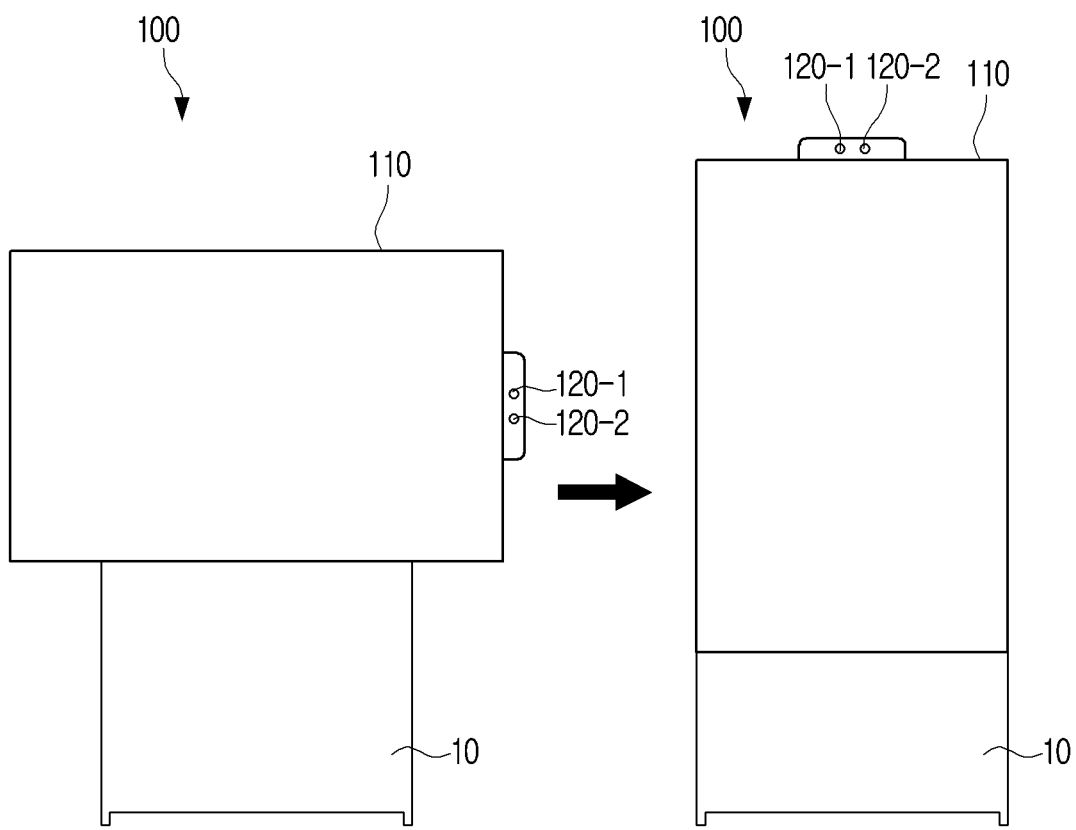
FIG. 1A is a diagram illustrating rotation of a display according to an embodiment.

Hereinafter, various embodiments of the disclosure will be described with reference to the accompanying drawings. However, it should be noted that the various embodiments are not intended to limit the scope of the embodiments described in the disclosure, but they should be interpreted to include various modifications, equivalents, and/or alternatives of the embodiments of the disclosure. Also, with respect to the detailed description of the drawings, similar components may be designated by similar reference numerals.

In the disclosure, terms such as "have," "may have," "include," and "may include" should be construed as denoting that characteristics and elements such as numerical values, functions, operations, and components, and the terms are not intended to exclude the existence of additional characteristics.

Also, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

In addition, the expressions "first," "second" and the like used in the disclosure may be used to describe various elements regardless of any order and/or degree of importance. Also, such expressions are used only to distinguish one element from another element, and are not intended to limit the elements.

Further, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element). In contrast, the description that one element (e.g., a first element) is "directly coupled" or "directly connected" to another element (e.g., a second element) can be interpreted to mean that still another element (e.g., a third element) does not exist between the one element and the another element.

Also, in the disclosure, "a module" or "a part" performs at least one function or operation, and may be implemented as hardware or software, or as a combination of hardware and software. Further, a plurality of "modules" or "parts" may be integrated into at least one module and implemented as at least one processor, except "modules" or "parts" which need to be implemented as specific hardware.

In addition, the expression "configured to" used in the disclosure may be interchangeably used with other expressions such as "suitable for," "having the capacity to," "designed to," "adapted to," "made to," and "capable of," depending on cases. The term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

Hereinafter, the disclosure will be described in detail with reference to the accompanying drawings.

FIG. 1 is a diagram illustrating a display apparatus according to an embodiment.

According to an embodiment, the display apparatus 100 may be implemented as a TV. However, the display apparatus 100 is not limited thereto.

Figure 1B:
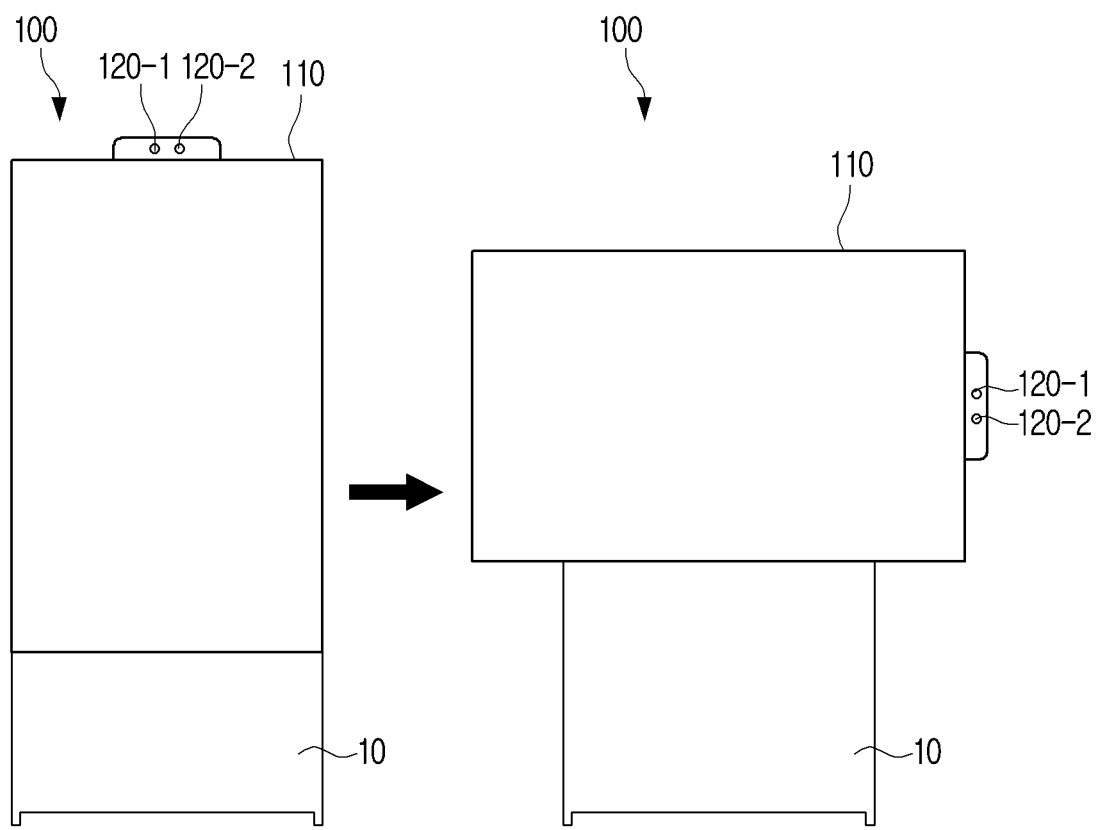
FIG. 1B is a diagram illustrating rotation of a display according to an embodiment.

Also, as in FIG. 1A and FIG. 1B, the display apparatus 100 may include a rotatable display 110.

Specifically, the display apparatus 100 may include a stand 10, and the display 110 may be mounted to be rotatable on the stand 10. For example, the display apparatus 100 may include a motor for rotating the display 110, etc.

As shown in FIGS. 1A and 1B, the display apparatus 100 may rotate the display 110 oriented (arranged) in a horizontal direction (or landscape orientation) to be oriented in a vertical direction (or portrait orientation). Also, the display apparatus 100 may rotate the display 110 oriented (arranged) in a vertical direction to be oriented a horizontal direction.

The display apparatus 100 may include a plurality of cameras 120-1, . . . , 120-n (here, n is an integer which is greater than or equal to 2).

Here, the plurality of cameras 120-1, . . . , 120-n may be provided on one side of the housing of the display apparatus 100.

For example, referring to FIG. 1A and FIG. 1B, in case the width of the display 110 is longer than the length, the plurality of cameras 120-1, . . . , 120-n may be provided on the vertical side which is relatively short in the housing of the display 110.

However, this is just an example, and the plurality of cameras 120-1, . . . , 120-n may be provided in the bezel area of the display 110, and in this case, the plurality of cameras 120-1, . . . , 120-n may be provided in the bezel area on the vertical side which is relatively short.

In FIG. 1A and FIG. 1B, it is illustrated that there are only two cameras 120-1 and 120-2, but this is only an example, and the display apparatus 100 can include two or more cameras.

Hereinafter, for the convenience of explanation, it will be assumed that the display apparatus 100 includes two cameras 120-1 and 120-2 for photographing images. Herein, the term "photographing an image" means capturing a moving image (video) or one more still images/pictures.

The plurality of cameras 120-1 and 120-2 may be rotated, and the display apparatus 100 may include a motor for rotating each camera 120-1, 120-2, etc.

In this case, each camera 120-1 and 120-2 may respectively rotate in an up-down direction and a left-right direction in the housing wherein the plurality of cameras 120-1 and 120-2 are included, or the housing itself, wherein the plurality of cameras 120-1 and 120-2 are included, may rotate in an up-down direction and a left-right direction.

Accordingly, the photographing directions of the cameras 120-1 and 120-2 may be changed.

For example, in case each camera 120-1 and 120-2 rotates in an upward direction or a downward direction, the photographing directions of each camera 120-1 and 120-2 may be changed to be more upward or more downward than the directions before rotation. Also, in case each camera 120-1 and 120-2 rotates in a leftward direction or a rightward direction, the photographing directions of each camera 120-1 and 120-2 may be changed to be more leftward or more rightward than the directions before rotation.

Accordingly, the display apparatus 100 may control the cameras according to the arrangement state of the display 110, for example, whether the display 110 is arranged in a horizontal direction or a vertical direction, and more detailed explanation will be provided below.

Figure 2:
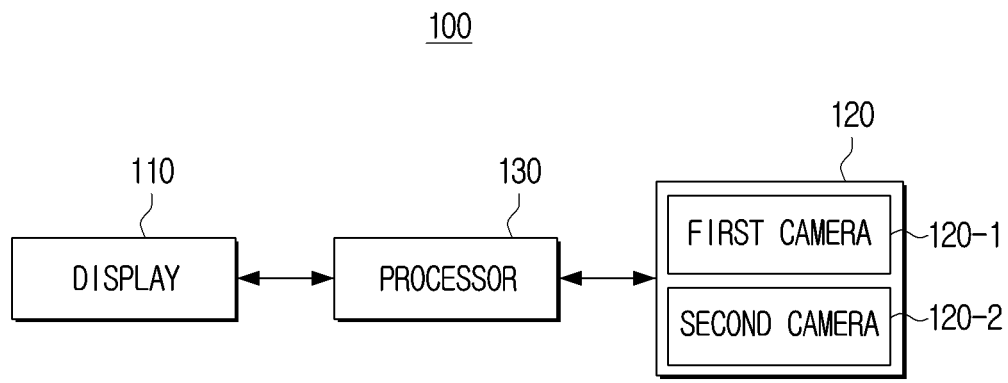
FIG. 2 is a block diagram illustrating a configuration of a display apparatus according to an embodiment.

FIG. 2 is a block diagram illustrating a configuration of a display apparatus according to an embodiment.

Referring to FIG. 2, the display apparatus 100 may include a display 110, a plurality of cameras 120-1 and 120-2, and a processor 130.

The display 110 may be mounted on the display apparatus 100 to be rotatable.

For example, the display 110 may be mounted on the stand 10 so as to allow the display apparatus 100 stand from the ground or the floor, and may be arranged in a horizontal direction or a vertical direction. Also, the display 110 arranged in the horizontal direction may be rotated to the vertical direction, and the display 110 arranged in the vertical direction may be rotated to the horizontal direction. For this, the display apparatus 100 may include a motor for rotating the display 110, etc.

Also, the display 110 may be implemented as various types of displays such as a liquid crystal display (LCD), light emitting diodes (LEDs), organic light emitting diodes (OLEDs), quantum dot light emitting diodes (QLEDs), etc.

The plurality of cameras 120-1 and 120-2 may respectively photograph images. For this, each camera 120-1 and 120-2 may include an image sensor and a lens, etc.

Here, the plurality of cameras 120-1 and 120-2 may be arranged at different angles from each other. For example, the plurality of cameras 120-1 and 120-2 may include a first camera 120-1 capturing images using a general lens and a second camera 120-2 capturing images using a wide-angle (or an ultra wide-angle) lens having a greater view of angle than a general lens.

The processor 130 may control the overall operations of the display apparatus 100. Specifically, the processor 130 may be electrically connected with the display 110 and the plurality of cameras 120-1 and 120-2, and control these components.

The processor 130 may include a central processing unit (CPU) or an application processor (AP). Also, the processor 130 may execute one or more software programs stored in the memory according to at least one instruction stored in the memory of the display apparatus 100.

For example, in case the display 110 is arranged in a vertical direction, the processor 130 may perform photographing by using one of the plurality of cameras 120-1 and 120-2. Then, the processor 130 may display the photographed image on the display 110.

While the display 110 is arranged in a vertical direction, if an application for photographing a picture or a moving image according to a user command is executed, or an application for a video call is executed, the processor 130 may perform photographing by using one of the plurality of cameras 120-1 and 120-2.

In this case, the processor 130 may perform photographing by using the first camera 120-1 performing photographing by using a general lens among the plurality of cameras 120-1 and 120-2.

If a user command for rotating the display 110 arranged in a vertical direction to a horizontal direction is input, the processor 130 may rotate the display 110 to the horizontal direction.

Specifically, the processor 130 may drive the motor for rotating the display 110, and thereby rotate the display 110 from the vertical direction to the horizontal direction.

Here, a user command may be received from a remote controller for controlling the display apparatus 100, or may be input through a button or touch screen provided on the display apparatus 100.

The processor 130 may rotate the display 110 to the horizontal direction according to a user command, and stop photographing through the camera. That is, the processor 130 may stop photographing by the first camera 120-1 that was performing photographing while the display 110 was arranged in the vertical direction.

Instead, the processor 130 may perform photographing by using the second camera 120-2.

Here, the second camera 120-2 may be a camera having a greater angle of view than the first camera 120-1. That is, the second camera 120-2 may be a camera performing photographing by using a wide-angle (or an ultra wide-angle) lens having a greater angle of view than a general lens.

Specifically, the processor 130 may perform photographing by using the first camera 120-1 among the plurality of cameras 120-1 and 120-2 while the display 110 is arranged in the vertical direction, and if a user command for rotating the display 110 to the horizontal direction is input, the processor 130 may rotate the display 110 to the horizontal direction, stop photographing through the first camera 120-1, and perform photographing through the second camera 120-2.

Then, the processor 130 may control the display 110 to display an image photographed by the second camera 120-2.

Accordingly, in case the display 110 is arranged in the horizontal direction, the image photographed by the second camera 120-2 may be displayed on the display 110.

In this case, the processor 130 may identify an object included in the image photographed through the first camera 120-1 in the image photographed through the second camera 120-2, and display the image photographed by using the second camera 120-2 on the display 110 such that the identified object is displayed in the center area of the display 110 arranged in the horizontal direction.

Specifically, while the display 110 is arranged in the vertical direction, the processor 130 may photograph an image through the first camera 120-1, and identify an object in the photographed image. Here, the object may include a person's face, etc.

Then, the processor 130 may rotate the display 110 arranged in the vertical direction to the horizontal direction according to a user command, and as the display 110 rotates, the processor 130 may control the first camera 120-1 to stop photographing, and control the second camera 120-2 to start photographing.

In this case, the processor 130 may identify an object identical to the object identified in the image photographed through the first camera 120-1 in the image photographed through the second camera 120-2. Based on identifying an identical object in the image photographed through the second camera 120-2, the image photographed through the second camera 120-2 may be displayed on the display 110 arranged in the horizontal direction such that the identified object is displayed in the center area of the display 110 arranged in the horizontal direction.

That is, the processor 130 may detect an area including a person's face in the image photographed through the first camera 120-1 by using a face detection algorithm, etc., and acquire first feature data by analyzing the eyes, nose, mouth, etc. in the detected area.

Then, the processor 130 may detect an area including a face in the image photographed through the second camera 120-2 and acquire second feature data by analyzing the eyes, nose, mouth, etc. in the detected area. Then, the processor 130 may compare the second feature data with the first feature data acquired in the image photographed through the first camera 120-1, and determine a face area wherein the feature data coincide (or, match) in the image photographed through the second camera 120-2.

That is, the processor 130 may determine an area including the same face as the face identified in the image photographed through the first camera 120-1 in the image photographed through the second camera 120-2.

Then, the processor 130 may display the image photographed through the second camera 120-2 on the display 110, such that the area determined in the image photographed through the second camera 120-2 is displayed in the center area of the display 110 arranged in the horizontal direction.

In addition, if a user command for rotating the display 110 arranged in the horizontal direction to the vertical direction is input, the processor 130 may rotate the display 110 in the vertical direction, and stop photographing through the second camera 120-2.

In this case, the processor 130 may photograph an image through the first camera 120-1, and display the photographed image on the display 110 arranged in the vertical direction.

As described above, the display apparatus 100 may change the camera performing photographing according to the arrangement state of the display 110.

According to the embodiments described above, the problem of a user having to switch his or her position according to the arrangement of the display is addressed. Specifically, if the display 110 is rotated, the location wherein the camera performs photographing is changed, and in this case, a user has to change his or her location or position as the display 110 is rotated so that his or her appearance can be photographed accurately, and this may cause inconvenience to the user.

Accordingly, a first image may be photographed through the first camera 120-1 while the display 110 is arranged in the vertical direction, and then, if the display 110 is rotated to the horizontal direction, a second image may be photographed by using the second camera 120-2 having a greater angle of view than the first camera 120-1.

This is because, if the display 110 is rotated from the vertical direction to the horizontal direction, the location of the camera is changed to be relatively more leftward or rightward than when the direction was the vertical direction. Accordingly, in case the display 110 is arranged in the horizontal direction, the processor 130 performs photographing by using a camera having a relatively wider angle of view than a camera used when the direction of the display 110 was arranged in the vertical direction.

Then, the processor 130 may detect a face detected in the image photographed when the display 110 was in the vertical direction in the image photographed when the display 110 was in the horizontal direction, and display the photographed image on the display 110 arranged in the horizontal direction such that the area including the detected face is displayed in the center portion of the display 110 arranged in the horizontal direction.

Accordingly, even if the location of the camera performing photographing is changed as the direction of the display 110 is changed, an image of the user can be photographed correctly and provided to the user without causing inconvenience to the user.

Figure 3A:
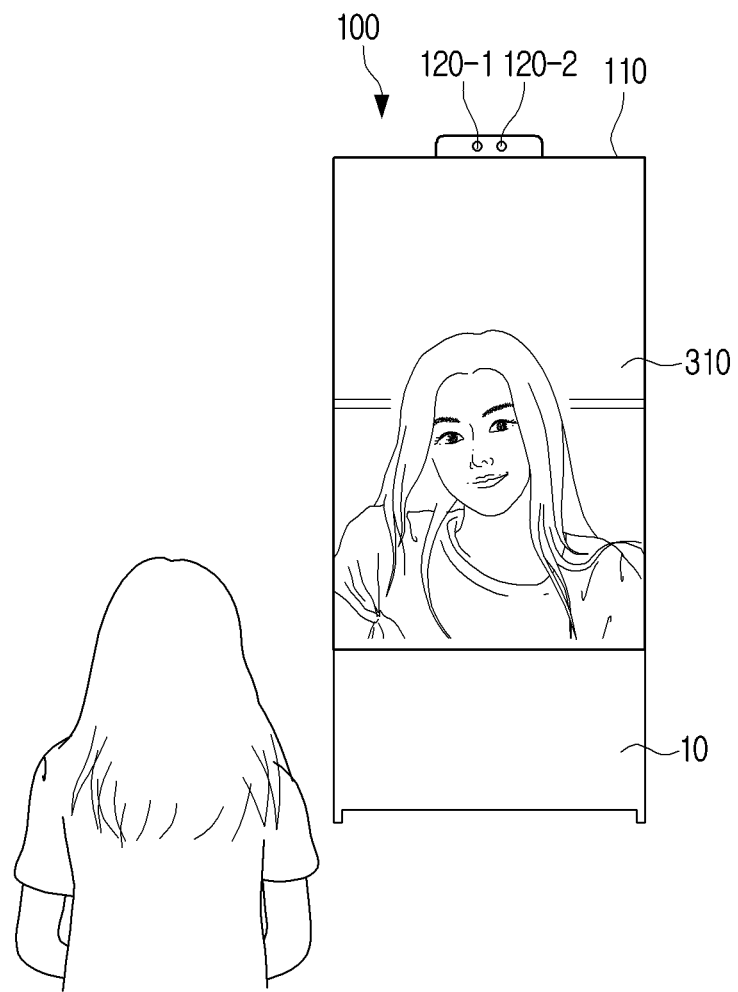
FIG. 3A is a diagram illustrating a method of performing photographing through a camera according to a direction of a display according to an embodiment.

For example, referring to FIG. 3A, while the display 110 is arranged in the vertical direction, the processor 130 may photograph an image by using the first camera 120-1 among the plurality of cameras 120-1 and 120-2, and display the photographed image 310 on the display 110.

Then, in response to a user command for rotating the display 110 arranged in the vertical direction to the horizontal direction being input, the processor 130 may rotate the display 110 to be arranged in the horizontal direction.

Figure 3B:
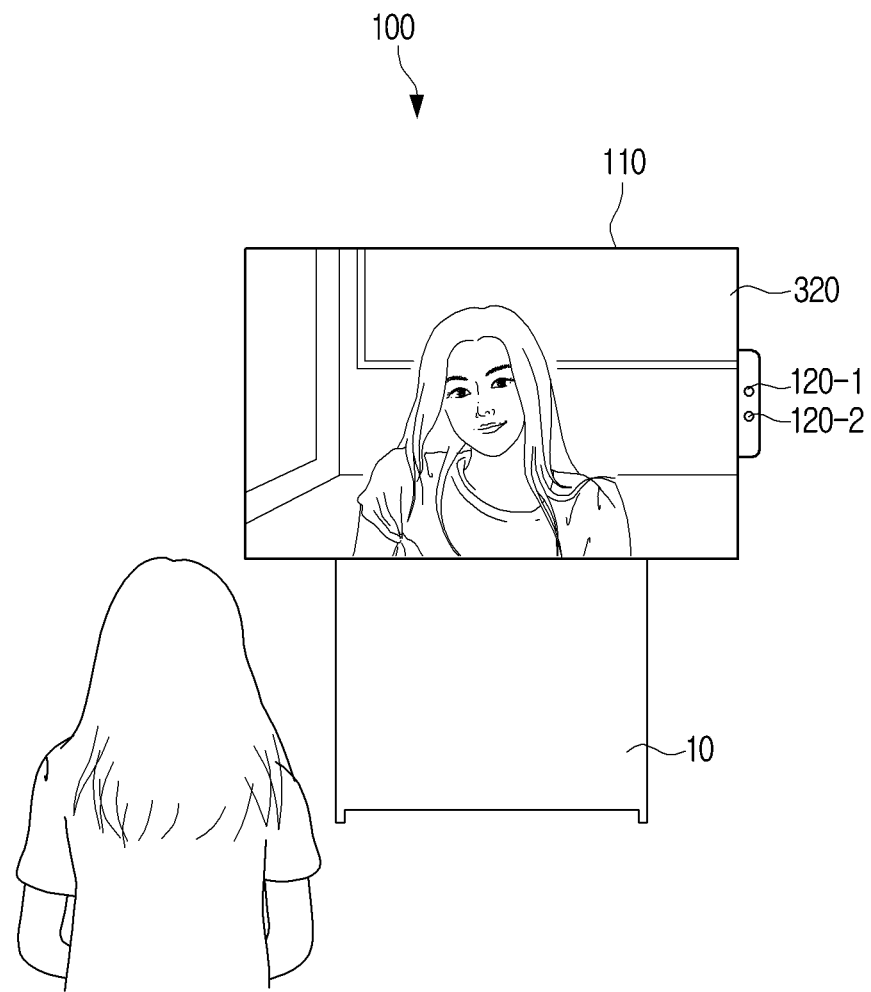
FIG. 3B is a diagram illustrating a method of performing photographing through a camera according to a direction of a display according to an embodiment.

In this case, the processor 130 may stop photographing using the first camera 120-1, referring to FIG. 3B, and start photographing an image using the second camera 120-2, and display the photographed image 320 on the display 110.

Here, the processor 130 may detect a face detected in the image 310 photographed when the display 110 was in the vertical direction in the image photographed when the display 110 was in the horizontal direction, and display the photographed image on the display 110 arranged in the horizontal direction such that the area including the detected face is displayed in the center portion of the display 110 arranged in the horizontal direction.

That is, referring to FIG. 3A and FIG. 3B, when the display 110 is arranged in the horizontal direction, the display apparatus 100 may photograph an image through the camera having a greater angle of view than when the display 110 is arranged in the vertical direction. Accordingly, even if photographing starts when the display 110 is in the vertical direction, and the display 110 is rotated in the horizontal direction afterwards, an image that photographed a user correctly can be provided.

In the aforementioned embodiments, it was described that, if the display 110 is rotated to the horizontal direction, photographing by the first camera 120-1 is stopped, and photographing is performed through the second camera 120-2, but this is merely an example.

As another example, while the display 110 is arranged in the horizontal direction, the processor 130 may continue to photograph an image by using the first camera 120-1 among the plurality of cameras 120-1 and 120-2.

In this case, while the display 110 is arranged in the vertical direction, the processor 130 may detect an area including a person's face in the image photographed through the first camera 120-1, and acquire first feature data by analyzing the eyes, nose, mouth, etc. in the detected area.

Then, if a user command for rotating the display 110 is input, the processor 130 may rotate the display 110 such that the display 110 is arranged in the horizontal direction.

Here, the processor 130 may also perform photographing through the first camera 120-1 in case the display 110 is arranged in the horizontal direction.

That is, the processor 130 may not stop photographing through the first camera 120-1, and perform photographing through the first camera 120-1 even after the display 110 is arranged in the horizontal direction.

Then, while the display 110 is arranged in the horizontal direction, the processor 130 may detect an area wherein a person's face is included in the image photographed through the first camera 120-1, and acquire second feature data by analyzing the eyes, nose, mouth, etc. in the detected area.

In this case, if the first feature data acquired from the image photographed while the display 110 was arranged in the horizontal direction and the second feature data acquired from the image photographed while the display 110 was arranged in the vertical direction coincide or match, the processor 130 may perform photographing by using the first camera 120-1.

However, in case a facial area is not detected from the image photographed while the display 110 was arranged in the horizontal direction, or the second feature data acquired from the image photographed while the display 110 was arranged in the vertical direction is not acquired from the image photographed while the display 110 was arranged in the horizontal direction, the processor 130 may stop photographing through the first camera 120-1, and perform photographing by using the second camera 120-2.

Figure 4:
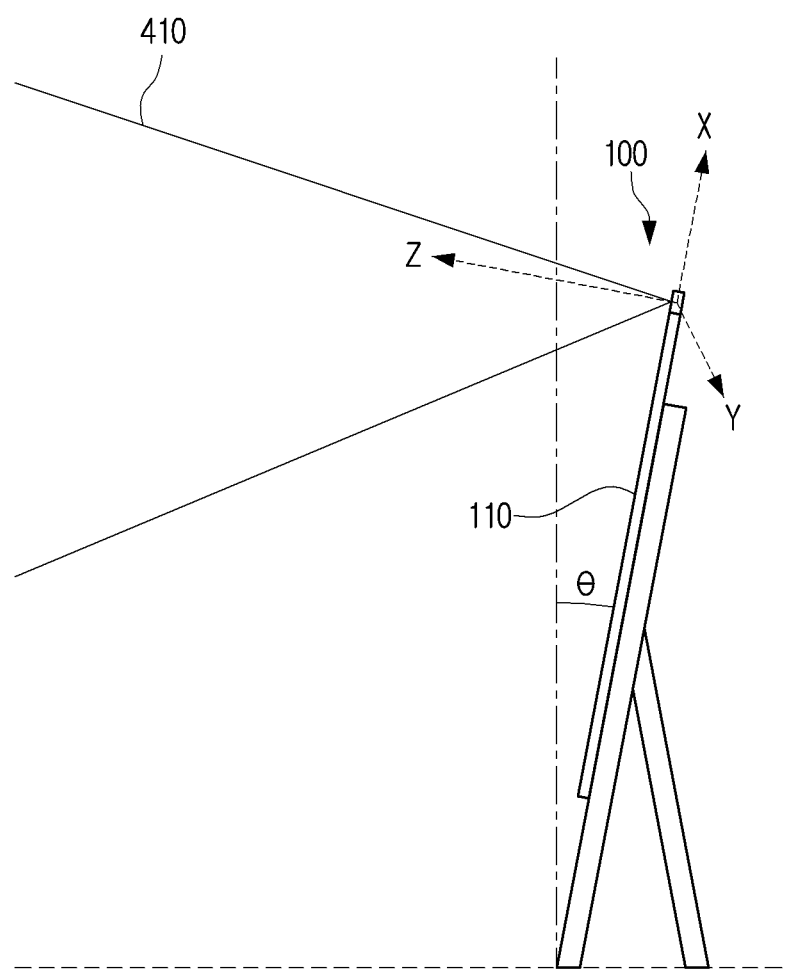
FIG. 4 is a diagram illustrating a display apparatus made to stand on a bottom according to an embodiment.

According to an embodiment, in the case in which the display apparatus 100 stands on the ground or floor using the stand 10, the display apparatus 100 may be configured to stand at a tilted angle θ from the ground as shown in FIG. 4, for instance.

For example, if the display apparatus 100 is tilted, the photographing direction 410 of the camera may be directed upward at a specific angle with respect to the horizontal plane. Thus, the camera may not accurately or correctly photograph a user located in the front of the display apparatus 100 if the camera's angle of view is not wide enough to capture an image of the user.

Therefore, the display apparatus 100 may identify the tilting angle by which the display 110 is tilted, and photograph an image by rotating the camera based on the identified tilting angle.

Here, the display apparatus 100 may further include a sensor. Here, the sensor may include at least one of an acceleration sensor, a tilt sensor, a gyro sensor, or a 3-axis magnetic sensor. The sensor may collect data and transmit the sensed data to the processor 130.

For example, if the sensor is an acceleration sensor, the sensor may measure the gravitational acceleration of each of the X axis, the Y axis, and the Z axis of the display 110.

Here, in a case in which the display apparatus 100 is standing slantingly from the horizontal plane, the display 110 mounted on the stand 10 may also be arranged slantingly. Thus, the gravitational acceleration of at least one axis measured by the sensor may be measured as a value which is not 0 m/sec$^2$, and here, the square root of the sum of the squares of the components of the three axes, i.e., the size of the vector sum may be a specific value (e.g., 9.8 m/sec$^2$). The sensor may detect the respective acceleration for the X axis, the Y axis, and the Z axis directions on the coordinate system. Here, according to the location of the sensor being attached to the display apparatus 100, each axis and the gravitational acceleration corresponding thereto may be changed.

The processor 130 may identify the tilting angle of the display 110 by using the gravitational acceleration transmitted from the sensor.

Here, the tilting angle may mean an angle by which the display 110 is tilted with respect to the plane perpendicular to the ground or floor on which the display apparatus 100 is made to stand. That is, the tiling angle is an angle between a surface of the display 110 and the plane perpendicular to the ground or floor.

In this case, the processor 130 may calculate the tilting angle of the display 110 (e.g., θ in FIG. 4) by using the acceleration measured with respect to each axis component transmitted from the sensor.

In the aforementioned embodiment, it was described that the processor 130 determines the tilting angle of the display 110 by using an acceleration sensor, but this is merely an example, and the processor 130 may determine the tilting angle of the display 110 by using various sensors such as a tilt sensor, a gyro sensor, a magnetic sensor, etc.

As described above, the processor 130 may identify the tilting angle of the display 110 based on sensing data received from the sensor.

Furthermore, the processor 130 may identify the tilting angle of the display 110 based on sensing data received from the sensor while the display 110 is arranged in the vertical direction.

Then, the processor 130 may rotate the photographing angle of the camera based on the identified tilting angle. Here, the camera may be a first camera 120-1.

Specifically, the processor 130 may determine the tilting angle of the display 110 while the display 110 is arranged in the vertical direction, and drive a motor of the first camera 120-1 to rotate the photographing angle of the first camera 120-1 to the lower direction as much as the determined tilting angle.

Figure 5A:
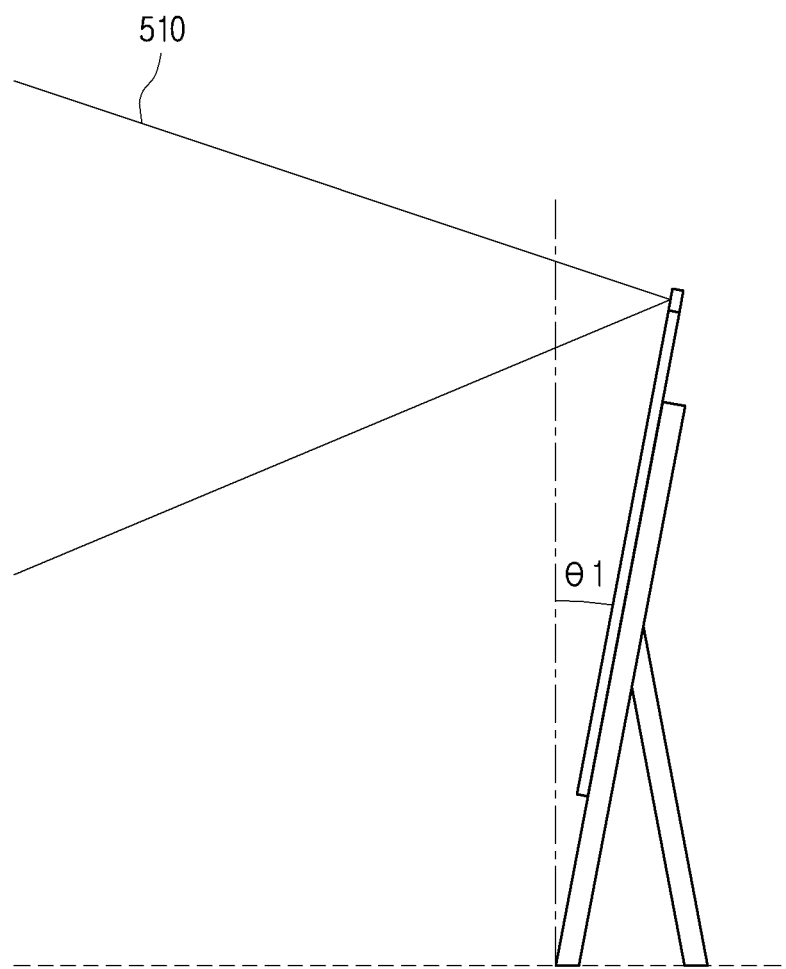
FIG. 5A is a diagram illustrating a method of changing a photographing direction of a camera in case a display is arranged in a vertical direction according to an embodiment.

For example, referring to FIG. 5A, we may assume that the tilting angle of the display 110 is $\theta_1°$ while the display 110 is arranged in the vertical direction.

Figure 5B:
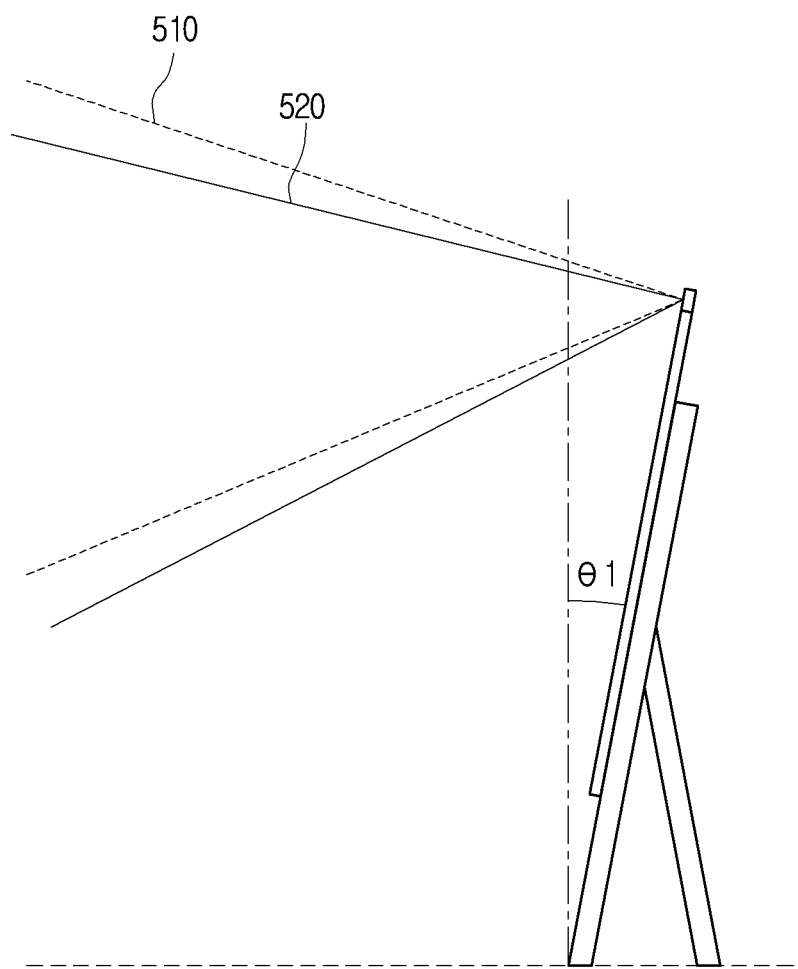
FIG. 5B is a diagram illustrating a method of changing a photographing direction of a camera in case a display is arranged in a vertical direction according to an embodiment.

In this case, as shown in FIG. 5B, the processor 130 may rotate the photographing angle of the first camera 120-1 to a lower direction as much as $\theta_1°$. Here, the processor 130 may rotate the first camera 120-1 to the lower direction in the housing, or rotate the housing itself in which the first camera 120-1 is included.

Accordingly, as illustrated in FIG. 5A and FIG. 5B, the angle of view 520 of the first camera 120-1 is directed toward the lower side as much as $\theta_1°$ compared to the angle of view 510 before the first camera 120-1 was rotated. Thus, the display apparatus 100 can photograph a user in front of the display apparatus 100 more accurately.

In addition, if the display 110 arranged in the vertical direction is rotated to the horizontal direction based on a user command for rotating the display 110, the processor 130 may identify the tilting angle of the display 110 based on sensing data received from the sensor.

Then, the processor 130 may rotate the photographing angle of the camera based on the identified tilting angle. Here, the camera may be a second camera 120-2.

Specifically, when the display 110 is arranged in the horizontal direction, the processor 130 may determine the tilting angle of the display 110, and drive the motor of the second camera 120-2 to rotate the photographing angle of the second camera 120-2 to the lower direction as much as the tilting angle.

Figure 6A:
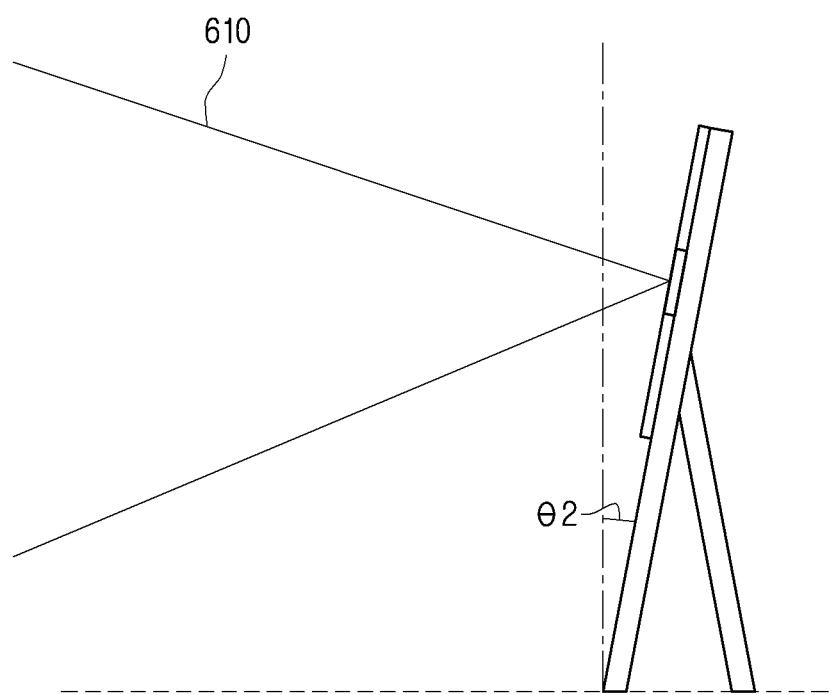
FIG. 6A is a diagram illustrating a method of changing a photographing direction of a camera in case a display is arranged in a vertical direction according to an embodiment.

For example, referring to FIG. 6A, it may be assumed that the tilting angle of the display 110 is $\theta_2°$ while the display 110 is arranged in the horizontal direction.

Figure 6B:
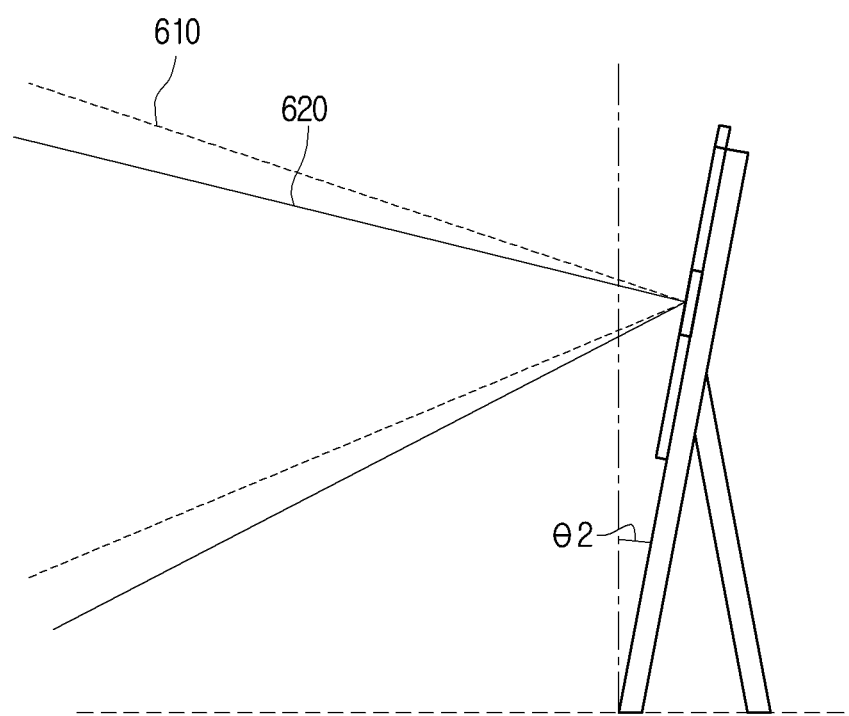
FIG. 6B is a diagram illustrating a method of changing a photographing direction of a camera in case a display is arranged in a vertical direction according to an embodiment.

In this case, as shown in FIG. 6B, the processor 130 may rotate the photographing angle of the second camera 120-2 to the lower direction as much as $\theta_2°$. Here, the processor 130 may rotate the second camera 120-2 to the lower direction in the housing, or rotate the housing itself in which the second camera 120-2 is included.

Accordingly, as illustrated in FIG. 6A and FIG. 6B, the angle of view 620 of the second camera 120-2 is lowered as much as $\theta_2°$ compared to the angle of view 610 before the second camera 120-2 is rotated. Thus, the display apparatus 100 can photograph a user in the front of the display apparatus 100 more accurately.

As described above, according to an embodiment, the photographing direction of the camera is changed according to the tilting degree of the display 110 with respect to the ground. Thus, a user in front of the display apparatus 100 can be photographed more accurately.

As another example, a user may want to change the direction of the display 110 according to the purpose of using the display apparatus 100.

For example, when a user wants to photograph himself or herself by using the camera, or perform a video call with another user by using the camera, the user may want to arrange the display 110 in the vertical direction. Also, when a user wants to view an image through broadcasting (in particular, an image of which width is longer than the length) or gaming, the user may want to arrange the display 110 in the horizontal direction.

As indicated above, according to the direction in which the display 110 is arranged, the camera may be used or may not be used.

For example, when a user does not use the camera, the display apparatus 100 may automatically cover the camera by using the camera cover, and thereby protect the privacy of the user.

Specifically, when the display 110 is arranged in the vertical direction, the processor 130 may photograph an image by using the first camera 120-1 among the plurality of cameras 120-1 and 120-2.

For example, if an application for photographing a picture or a moving image according to a user command is executed, or an application for a video call is executed while the display 110 is arranged in the vertical direction, the processor 130 may perform photographing by using the first camera 120-1.

Then, when a user command for finishing the executed application is input, the processor 130 may finish the executed application, and stop photographing by the first camera 120-1.

Afterwards, if a user command for rotating the display 110 arranged in the vertical direction to the horizontal direction is input, the processor 130 may rotate the display 110 to the horizontal direction.

In this case, the processor 130 may drive the camera cover such that the camera cover covers the plurality of cameras 120-1 and 120-2.

Specifically, while the display 110 is rotated to the horizontal direction, or after the display 110 is rotated to the horizontal direction, the processor 130 may drive the camera cover to cover the plurality of cameras 120-1 and 120-2.

Accordingly, while the display 110 is arranged in the horizontal direction, the plurality of cameras 120-1 and 120-2 may be covered.

Figure 7A:
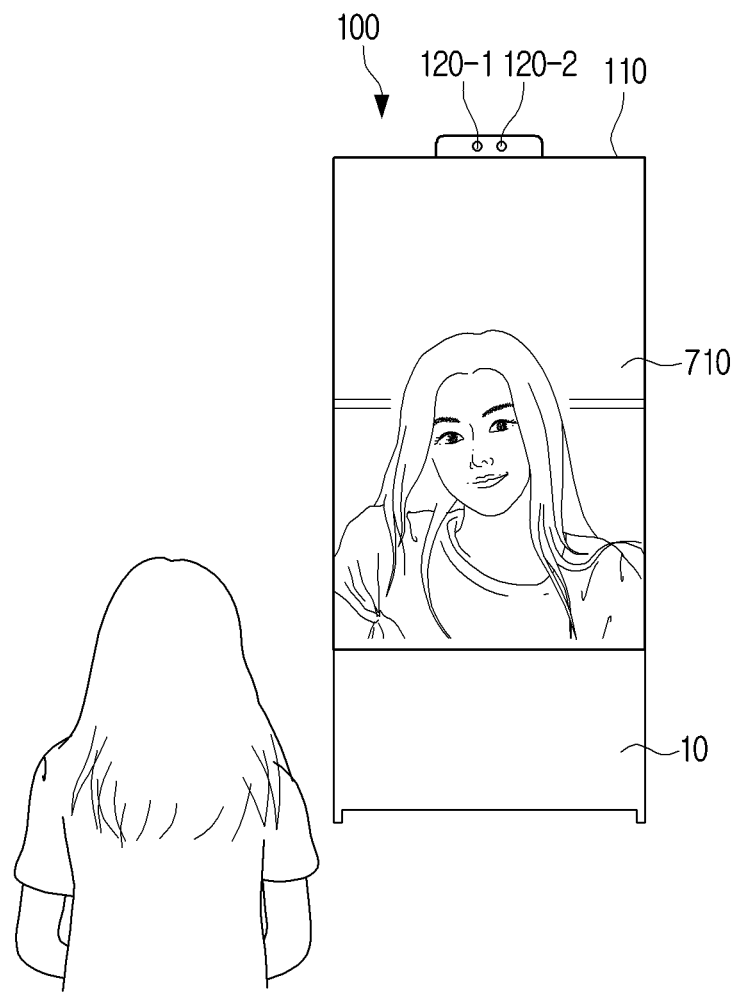
FIG. 7A is a diagram illustrating a method of covering a camera by a camera cover according to an embodiment.

For example, referring to FIG. 7A, when the display 110 is arranged in the vertical direction, if an application for photographing a picture or a moving image is executed, the processor 130 may photograph the user located in front of the display apparatus 100 by using the first camera 120-1, and display the photographed image 710 on the display 110.

Then, when a user command for finishing the executed application is input, the processor 130 may finish the application.

Afterwards, if a user command for rotating the display 110 is input, the processor 130 may rotate the display 110 to the horizontal direction.

Figure 7B:
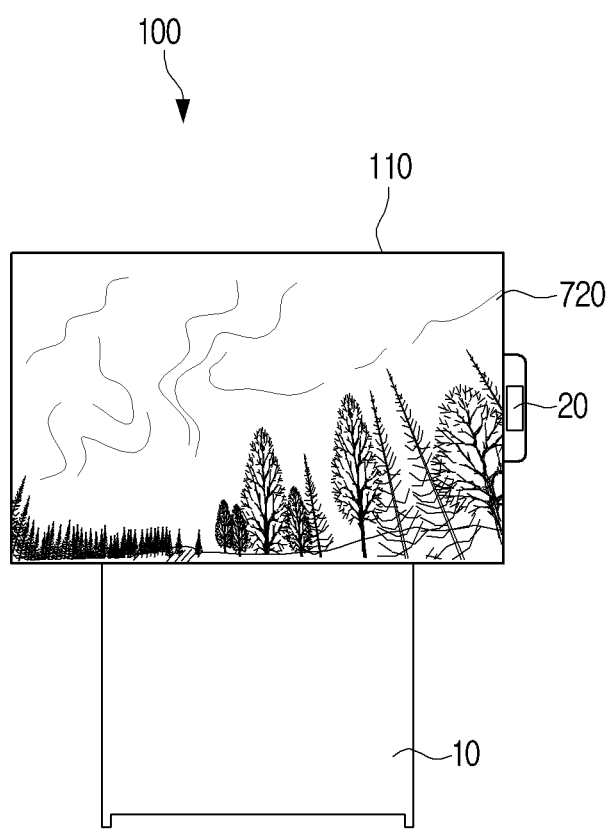
FIG. 7B is a diagram illustrating a method of covering a camera by a camera cover according to an embodiment.

In this case, as shown in FIG. 7B, the processor 130 may cover the plurality of cameras 120-1 and 120-2 through the camera cover 20.

Afterwards, if a user command for displaying broadcasting is input, the processor 130 may display a broadcasting image 720 on the display 110 arranged in the horizontal direction based on a broadcasting signal received from an external device providing the broadcasting signal.

As described above, the display apparatus 100 covers the camera by using the camera cover when a user does not wish to use the camera. Thus, the privacy of the user can be protected. However, the method of covering the camera is not limited thereto.

Figure 8:
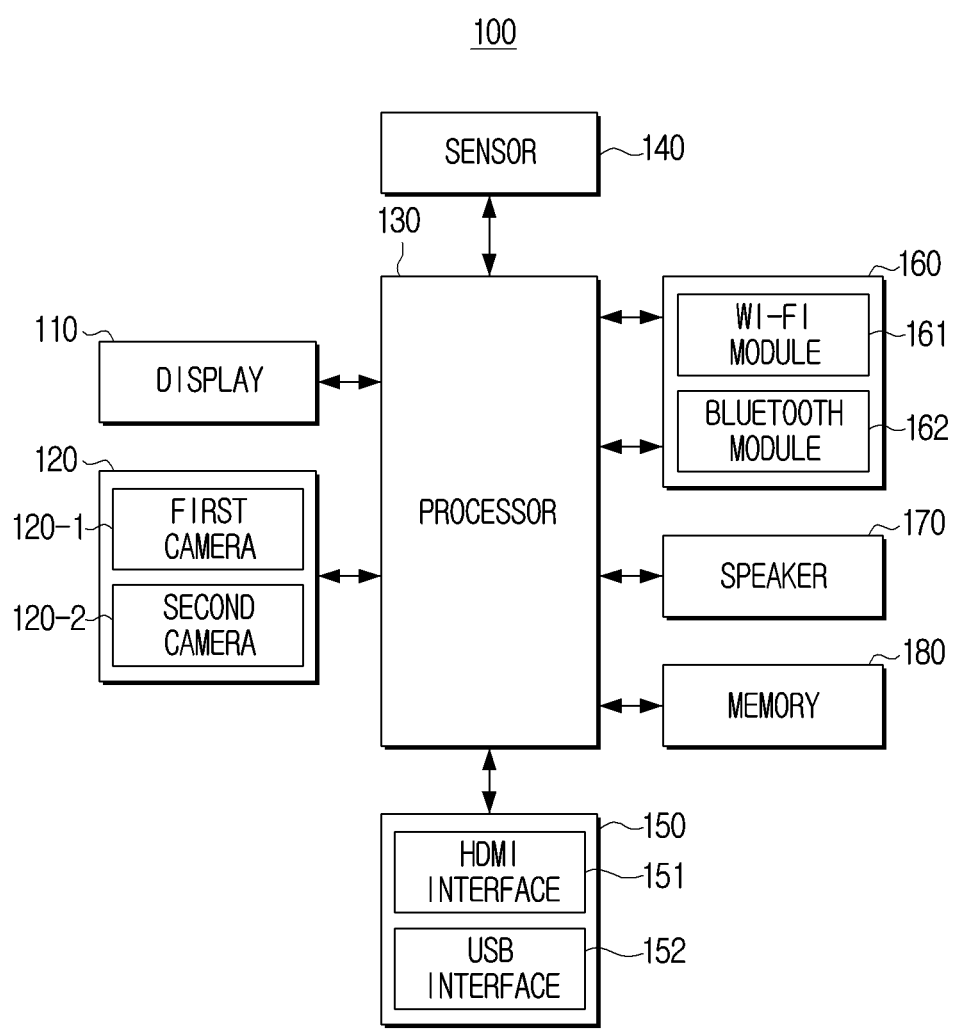
FIG. 8 is a block diagram illustrating a detailed configuration of a display apparatus according to an embodiment.

FIG. 8 is a block diagram illustrating a detailed configuration of a display apparatus according to an embodiment.

Referring to FIG. 8, the display apparatus 100 may include a display 110, a plurality of cameras 120 (120-1 and 120-2), a processor 130, a sensor 140, an interface 150, a communication interface 160, a speaker 170, and a memory 180. Here, these components may be controlled by the processor 130.

The components illustrated in FIG. 8 are merely examples, and depending on embodiments, at least some components can be omitted, or other components can be added.

The display 110, the plurality of cameras 120, and the processor 130 may perform the functions as described above, and thus overlapping explanation for these components will be omitted.

The sensor 140 may include at least one of an acceleration sensor, a tilt sensor, a gyro sensor, or a magnetic sensor, and may transmit the sensed data to the processor 130.

In this case, the processor 130 may determine the tilting angle and rotation, etc. of the display 110 by using the sensing data received from the sensor 140. Here, a method of measuring the tilting angle and rotation, etc. of the display 110 by using an accelerometer, etc. may be implemented among various methods.

The interface 150 may be connected with various external apparatuses. As an example, the interface 150 may be connected with external apparatuses by using various communication methods such as a high definition multimedia interface (HDMI), a universal serial bus (USB), etc.

The interface 150 may include an HDMI interface 151 including at least one HDMI port for HDMI communication, and a USB interface 152 including a USB port for USB 2.0 and/or USB 3.0 communication.

The external apparatuses may include a dongle, a set top box, etc. In this case, the HDMI interface 151 may include a plurality of HDMI ports, and the dongle and the set top box may respectively be connected through each HDMI port. Also, the dongle may be connected with a USB port.

In this case, the processor 130 may display images received from external apparatuses respectively connected with the HDMI interface 151 and the USB interface 152 on the display 110, and output audio received from the external apparatuses through the speaker 170.

Furthermore, the interface 150 may include a component terminal, an optical terminal, an Ethernet terminal for connection with a local area network (LAN) cable, etc.

The communication interface 160 may perform communication with external apparatuses. Here, the communication interface 160 may include a Wi-Fi module 161 for Wi-Fi communication and a Bluetooth module 162 for Bluetooth communication.

The Wi-Fi module 161 may be connected with an access point, and access the Internet through the access point and perform communication with a server.

For example, the processor 130 may execute an application stored in the memory 180 according to a user command and access the server providing services through the application, and receive various data such as images and audio from the server through the Wi-Fi module 161.

The Bluetooth module 162 may perform communication with apparatuses located in vicinity to the display apparatus 100.

For example, the processor 130 may control the Bluetooth module 162 such that it performs pairing with an apparatus located around the display apparatus 100. For example, an electronic apparatus such as a remote controller may be communicatively connected to the electronic apparatus.

In this case, if a control command is received from the electronic apparatus through the Bluetooth module 162, the processor 130 may control the display apparatus 100 according to the received control command.

For example, if a user command for rotating the display 110 is received from the electronic apparatus through the Bluetooth module 162, the processor 130 may rotate the display 110 arranged in the horizontal direction to the vertical direction, or rotate the display 110 arranged in the vertical direction to the horizontal direction based on the received user command.

Also, the communicator 160 may include a local area network (LAN) module. The LAN module may access the Internet through a LAN cable connected with an Ethernet terminal and perform communication with the server.

For example, the processor 130 may execute an application stored in the memory 180 according to a user command and access the server providing services through the application, and receive various data such as images and audio from the server through the LAN module.

When images and audio, etc. are received through the communication interface 160, the processor 130 may display the received images on the display 110, and output the received audio through the speaker 170.

The speaker 170 may output audio. Here, the processor 130 may output audio received from the dongle, the set top box, the server, etc. through the speaker 170.

The memory 180 may store various instructions, software programs, applications, and data, etc. related to the display apparatus 100.

Here, the processor 130 may execute one or more software programs stored in the memory 180 according to at least one instruction stored in the memory 180, and control the overall operations of the display apparatus 100.

As illustrated in FIG. 1A and FIG. 1B, the plurality of cameras 120-1 and 120-2 may be housed inside the display apparatus 100.

However, this is merely an example, and an apparatus including a plurality of cameras (hereinafter, referred to as a dongle) may be connected to the display apparatus 100 through the interface 150 of the display apparatus 100, and the processor 130 may control the plurality of cameras included in the dongle according to the direction in which the display 110 is arranged.

In this case, the dongle may include a plurality of cameras having different angle of views from one another.

For example, the plurality of cameras may include a first camera performing photographing by using a general lens and a second camera performing photographing by using a wide-angle (or, an ultra wide-angle) lens having a greater angle of view than an angle of view of the general lens.

For example, in case the display 110 is arranged in the vertical direction, the processor 130 may transmit a control command for performing photographing through the first camera among the plurality of cameras of the dongle to the dongle through the interface 150. In addition, when the display 110 is arranged in the horizontal direction, the processor 130 may transmit a control command for performing photographing through the second camera among the plurality of cameras of the dongle to the dongle through the interface 150.

Also, the processor 130 may transmit a control command for rotating the camera of the dongle to the lower side direction as much as the tilting angle to the dongle through the interface 150, based on the tilting angle of the display 110.

In addition, if it is determined that a user does not want to use the camera, the processor 130 may transmit a control command for covering the plurality of cameras to the dongle through the interface 150.

Here, as an example, in case an application using the camera is not executed, and the display 110 is arranged in the horizontal direction, the processor 130 may determine that a user does not want to use the camera.

Accordingly, the dongle may perform an operation according to a control command received from the display apparatus 100.

Figure 9:
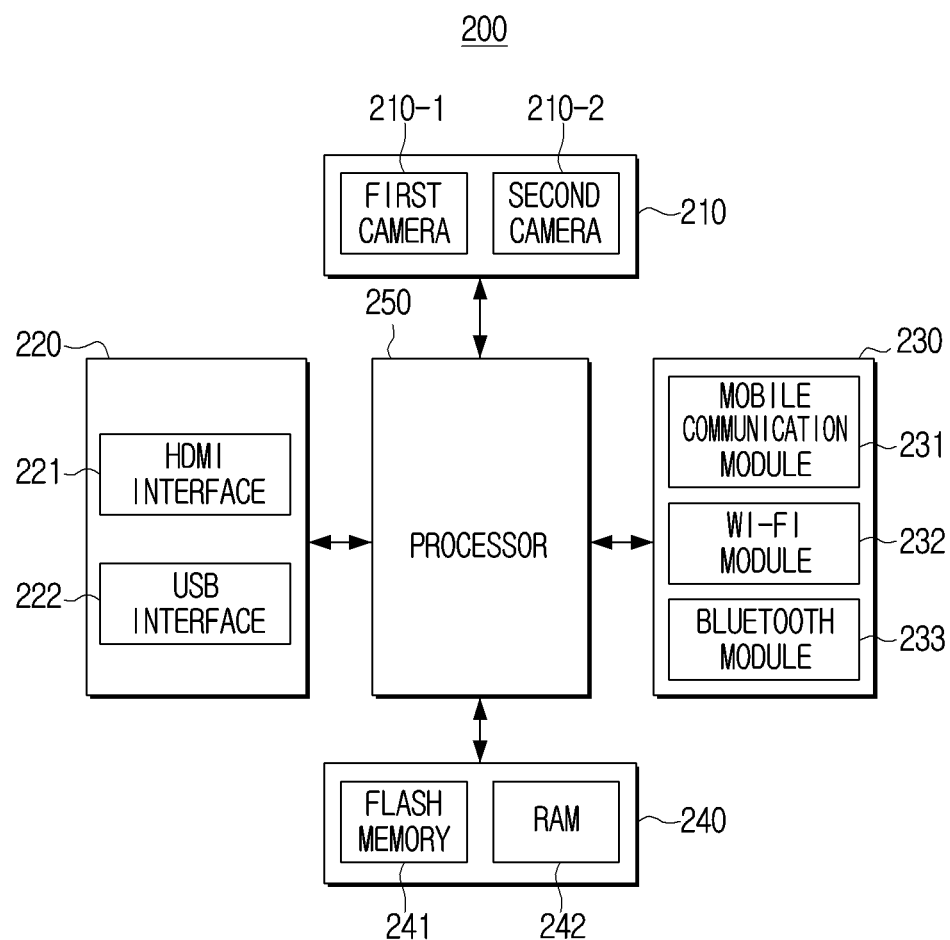
FIG. 9 is a block diagram illustrating a configuration of a dongle according to an embodiment.

FIG. 9 is a block diagram illustrating a configuration of a dongle according to an embodiment.

Referring to FIG. 9, the dongle 200 may include a plurality of cameras 210, an interface 220, a communication interface 230, a memory 240, and a processor 250.

Each of the plurality of cameras 210 may photograph images. Each camera 210-1, 210-2 may include an image sensor and a lens, etc. Here, the number of camera is not limited thereto, but may include more than two cameras.

The plurality of cameras 210-1, 210-2 may have different angle of views from one another. For example, the plurality of cameras 210 may include a first camera 210-1 performing photographing by using a general lens and a second camera 210-2 performing photographing by using a wide-angle (or, an ultra wide-angle) lens having a greater angle of view than that of a general lens.

Also, the plurality of cameras 210-1, 210-2 may be rotated. That is, the dongle 200 may include a motor, etc. configured to rotate each camera 210-1, 210-2.

In this case, each camera 210-1, 210-2 may respectively rotate in an up-down direction and a left-right direction in the housing of the dongle 200 in which the plurality of cameras 210-1, 210-2 are included. Also, the dongle 200 may rotate in an up-down direction and a left-right direction while it is connected with the display apparatus 100.

The interface 220 may be connected with the display apparatus 100. As an example, the interface 220 may be connected with the display apparatus 100 by using various communication methods such as an HDMI, a USB, etc.

Specifically, the interface 220 may include an HDMI interface 221 including an HDMI connector or an HDMI port for HDMI communication, and a USB interface 222 including a USB connector or a USB port for USB 2.0 and/or USB 3.0 communication. Also, the interface 220 may be directly connected with the display apparatus 100, or connected with the display apparatus 100 through a separate cable.

The communication interface 230 may perform communication with external apparatuses. Specifically, the communication interface 230 may perform communication with external apparatuses by using various communication methods such as mobile communication, Wi-Fi, Bluetooth, etc.

The communicator 230 may include a mobile communication module 231 for mobile communication such as 3rd Generation (3G), 3rd Generation Partnership Project (3GPP), Long Term Evolution (LTE), 5th Generation (5G), etc., a Wi-Fi module 232 for Wi-Fi communication, and a Bluetooth module 233 for Bluetooth communication.

Specifically, the mobile communication module 231 may access the Internet through a mobile communication network and perform communication with the server, and the Wi-Fi module 232 may be connected with the access point, and access the Internet through the access point, and perform communication with the server. Also, the Bluetooth module 233 may perform communication with apparatuses located around the dongle 200.

The memory 240 may store various instructions and software programs, etc. related to the operations of the dongle 200. The memory 240 may include a flash memory 241 and a RAM 242.

The processor 250 may control the overall operations of the dongle 200. That is, the processor 250 may be electrically connected with the plurality of cameras 210-1, 210-2, the interface 220, the communicator 230, and the memory 240, and control these components.

The processor 250 may include a central processing unit (CPU) or an application processor (AP). Also, the processor 250 may execute one or more software programs stored in the memory 130 according to one or more instructions stored in the memory 240.

For example, if power is applied to the dongle 200, the processor 250 may drive the operating system (OS) stored in the flash memory 241 by using the RAM 242. Here, the OS may be an OS used in portable apparatuses such as smartphones, tablets, etc. like Android, etc.

The power applied to the dongle 200 may be provided from the display apparatus 100 connected with the dongle 200 through a USB interface 222. However, depending on embodiments, the dongle 200 may include a separate battery for supplying power.

Also, the processor 250 may load an application stored in the flash memory 241 on the RAM 242 and execute the application through the OS.

Here, the application may be an application program executed based on the OS of the dongle 200. For example, in a case in which the OS installed on the dongle 200 is Android, the application may be an application program that can be executed in Android. In this case, the application may be stored in the memory 240 in the manufacturing stage of the dongle 200, or downloaded from a server providing the application (e.g., play store, etc.) according to a user command and stored in the memory 240.

Furthermore, the processor 250 may control various operations of the dongle 200 based on a control command received from the display apparatus 100 through the interface 220.

Specifically, if a control command for performing photographing through the first camera 210-1 among the plurality of cameras 210-1, 210-2 is received from the display apparatus 100, the processor 250 may perform photographing through the first camera 210-1, and transmit the photographed image to the display apparatus 100 through the interface 220.

Also, if a control command for performing photographing through the second camera 210-2 among the plurality of cameras 210-1, 210-2 is received from the display apparatus 100, the processor 250 may perform photographing through the second camera 210-2, and transmit the photographed image to the display apparatus 100 through the interface 220.

In addition, if a control command for rotating at least one of the plurality of cameras 210-1, 210-2 to a lower direction at a specific angle (e.g., the tilting angle of the display 110) is received from the display apparatus 100, the processor 250 may rotate the camera to the lower direction at the received angle, and transmit an image photographed through the rotated camera to the display apparatus 100 through the interface 220.

Also, if a control command for covering the plurality of cameras 210-1, 210-2 is received from the display apparatus 100, the processor 250 may cover the plurality of cameras 210-1, 210-2 with the camera cover.

Here, the dongle 200 may include a camera cover for covering the plurality of cameras 210-1, 210-2, and accordingly, if a control command for covering the plurality of cameras is received, the processor 250 may drive the camera cover to cover the plurality of cameras 210-1, 210-2.

Figure 10:
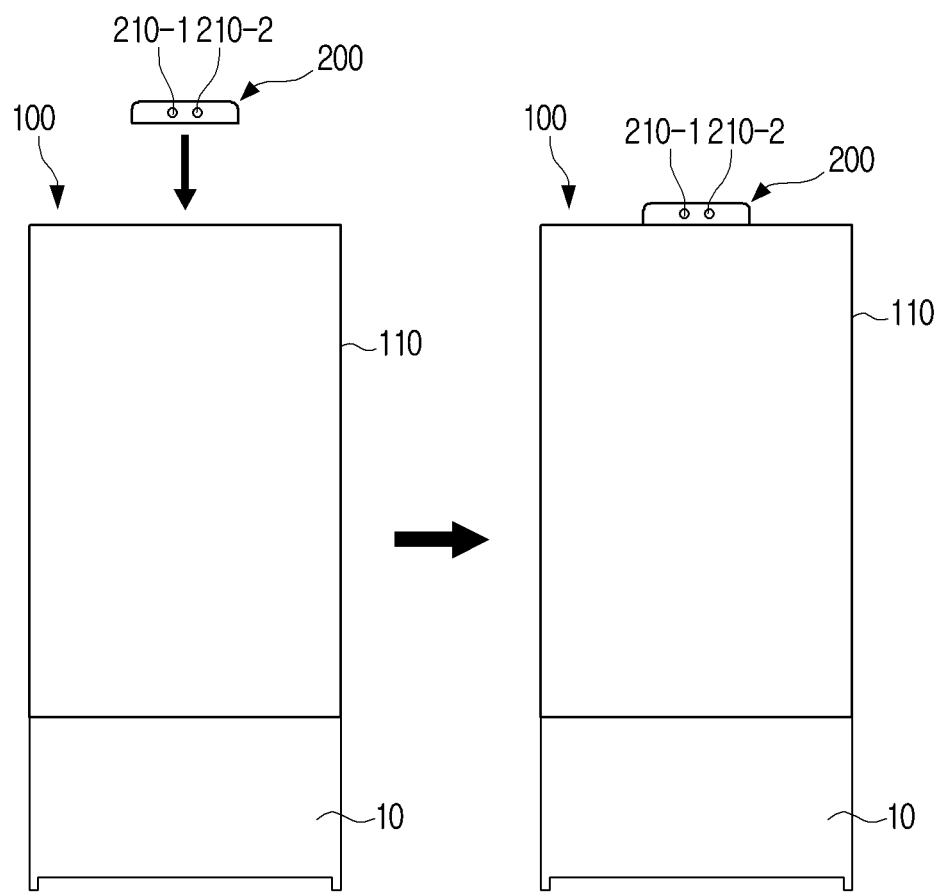
FIG. 10 is a diagram illustrating a method of connecting a dongle to a display apparatus according to an embodiment.

FIG. 10 is a diagram illustrating a method of connecting a dongle to a display apparatus according to an embodiment.

The dongle 200 may be connected with the display apparatus 100. For example, as illustrated in FIG. 10, the dongle 200 may be connected with the display 110 on one side (e.g., the vertical side) of the display 110 of the display apparatus 100.

The display apparatus 100 may provide a video call function by using the camera included in the dongle 200.

For example, it may be assumed that a user is performing a video call with another user by using an electronic apparatus (e.g., a mobile phone).

Specifically, a first electronic apparatus of a user may transmit an image photographed through the camera of the first electronic apparatus and audio received by a microphone of the first electronic apparatus to a second electronic apparatus (e.g., a mobile phone) of another user through the server. The first electronic apparatus may then receive an image and audio from the second electronic apparatus of another user through the server. Based on the communication with the second electronic apparatus, the first electronic apparatus of the user may transmit the image and audio received from the second electronic apparatus to the display apparatus 100, and the display apparatus 100 may output the received image and audio respectively through the display and the speaker provided in the display apparatus 100.

In this case, the display apparatus 100 may perform a video call with the second electronic apparatus of another user in place of the first electronic apparatus of the user using the camera included in the dongle 200. Here, more detailed explanation will be made below.

Specifically, a user may execute an application for a video call installed on the first electronic apparatus, log in through his or her user account, and perform a video call with a counterpart by using the logged-in user account.

Here, if the first electronic apparatus is within a predetermined distance from the display apparatus 100, or contacts the display apparatus 100, the first electronic apparatus may perform communication with the display apparatus 100 by using a near field wireless communication (NFC) method.

Accordingly, the first electronic apparatus and the display apparatus 100 may respectively include a NFC communication module.

Therefore, the first electronic apparatus of the user may transmit information on an application for a video call (e.g., identification information such as the name of the application, etc.) and information on the logged-in user account (e.g., the ID and the password, etc.) to the display apparatus 100 by using a near field wireless communication method.

Accordingly, the processor 130 of the display apparatus 100 may receive the information on the application and the information on the user account from the first electronic apparatus.

In this case, the processor 130 may determine an application for a video call among at least one application installed on the display apparatus 100 by using the received information on the application, and execute the determined application. Then, the processor 130 may perform log-in by using the received information on the user account, and receive an image and audio from the second electronic apparatus of the counterpart through the server.

Then, the processor 130 may output the received image and audio respectively through the display 110 and the speaker 170.

Also, the processor 130 may transmit a control command for performing photographing through the camera to the dongle 200 through the interface 150. In this case, the processor 250 may perform photographing by using any one camera among the plurality of cameras 210-1, 210-2 according to the control command received from the display apparatus 100, and transmit the photographed image to the display apparatus 100 through the interface 220.

Furthermore, the processor 130 may receive audio through the microphone provided on the display apparatus 100, and control the communication interface 160 to transmit the audio received through the microphone and the image received from the dongle 200 to the second electronic apparatus of the counterpart through the server.

Figure 11A:
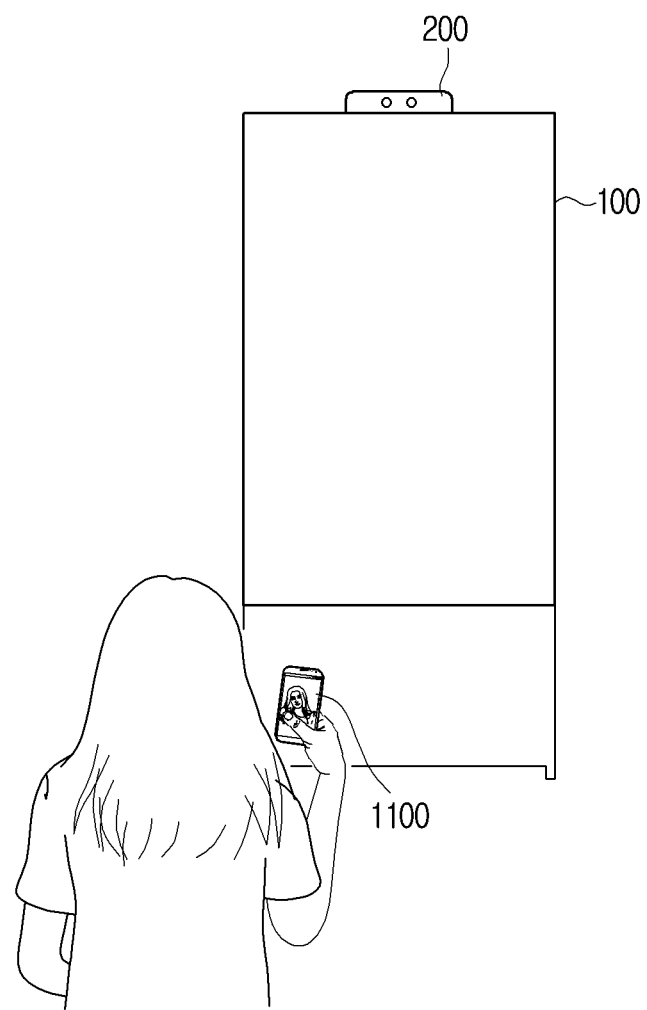
FIG. 11A is a diagram illustrating a method of providing a video call function through a camera of a dongle according to an embodiment.
Figure 11B:
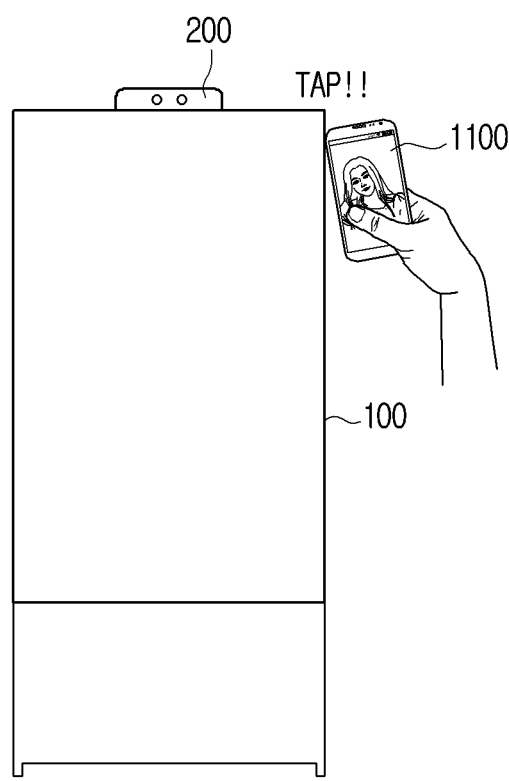
FIG. 11B is a diagram illustrating a method of providing a video call function through a camera of a dongle according to an embodiment.

For example, when a user is performing a video call with a counterpart by using a mobile phone 1100 as shown in FIG. 11A, the mobile phone 1100 may be in the vicinity of the display apparatus 100 or may come in contact the display apparatus 100 as shown in FIG. 11B.

Figure 11C:
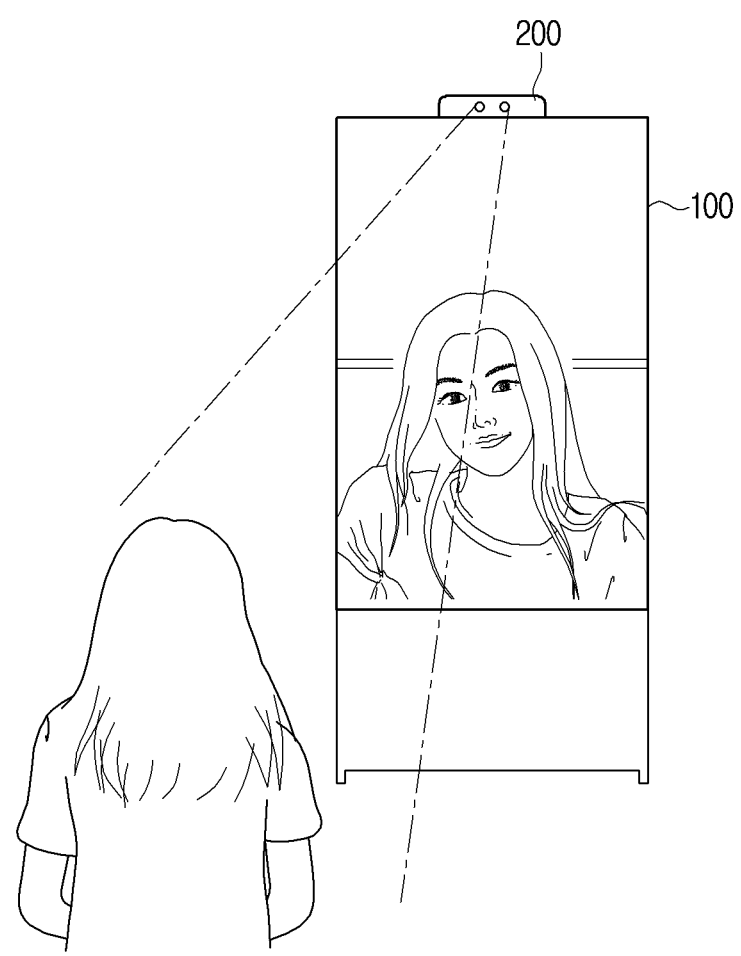
FIG. 11C is a diagram illustrating a method of providing a video call function through a camera of a dongle according to an embodiment.

In this case, referring to FIG. 11C, the display apparatus 100 may display an image received from the second electronic apparatus of the counterpart of the call on the display 110, and output audio received from the second electronic apparatus of the counterpart of the call through the speaker 170 of the display apparatus 100.

Then, the display apparatus 100 may transmit audio received through the microphone provided on the display apparatus 100 and an image photographed at the dongle 200 to the second electronic apparatus of the counterpart of the call.

As described above, according to an embodiment, the display apparatus 100 can provide a seamless video call for a user in place of an electronic apparatus of the user.

Figure 12:
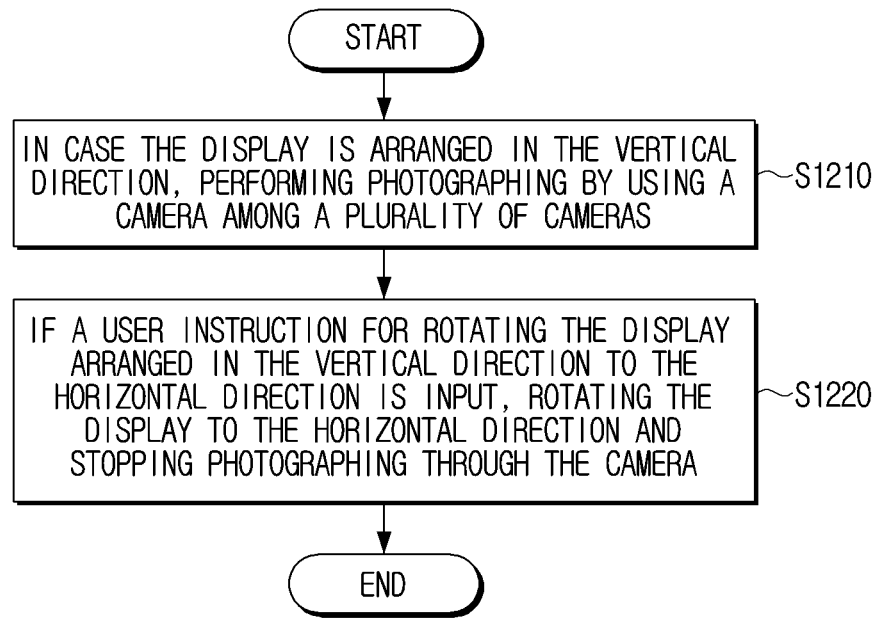
FIG. 12 is a flow chart illustrating a control method of a display apparatus according to an embodiment.

FIG. 12 is a flowchart illustrating a control method of a display apparatus according to an embodiment.

Here, the display apparatus may be a rotatable display.

First, in a case in which the display is arranged in the vertical direction, photographing may be performed by using a camera among a plurality of cameras at operation S1210.

Then, if a user command for rotating the display arranged in the vertical direction to the horizontal direction is input, the display may be rotated to be oriented in the horizontal direction and photographing through the camera may be stopped at operation S1220.

The plurality of cameras may include a first camera and a second camera having a greater angle of view than that of the first camera.

At operation S1210, when the display is arranged in the vertical direction, photographing may be performed by using the first camera, and at operation S1220, if a user command is input, photographing through the first camera may be stopped and photographing may be performed through the second camera.

Here, an object included in a first image photographed through the first camera may be identified in a second image photographed through the second camera, and the second image photographed through the second camera may be displayed on the display such that the identified object is displayed in the center area of the display arranged in the horizontal direction.

Also, if a user command is input, the display may be rotated to the horizontal direction, and the camera cover may be driven such that the camera cover covers the plurality of cameras.

Also, while the display is arranged in the vertical direction, the tilting angle of the display may be identified based on sensing data received from the sensor, and the photographing angle of the first camera may be rotated based on the identified angle.

Here, the photographing angle of the camera may be rotated to a lower direction as much as the identified angle.

Also, if the display is rotated to the horizontal direction according to a user command, the tilted angle of the display may be identified based on sensing data received from the sensor, and the photographing angle of the second camera may be rotated based on the identified angle.

According to the various embodiments described above, even if the location of the camera performing photographing is changed as the direction of the display is changed, a user can be accurately photographed without causing inconvenience to the user.

Also, even if the display apparatus stands on the ground or the floor while being tilted, a user in front of the display apparatus can be accurately photographed as the photographing direction of the camera is changed.

Various embodiments described above may be implemented as software including instructions stored in machine-readable storage media, which can be read by machines (e.g., computers). The machines may refer to apparatuses that call instructions stored in a storage medium, and can operate according to the called instructions, and the apparatuses may include the apparatus according to the aforementioned embodiments. In a case in which an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' may mean that a storage medium is tangible, and does not include signals (e.g., electromagnetic waves), but does not distinguish a case where data is stored in the storage medium semi-permanently and a case where data is stored in the storage medium temporarily. For example, 'a non-transitory storage medium' may include a buffer in which data is temporarily stored.

Also, various embodiments described herein may be provided through a computer program product. A computer program product refers to a product, and it can be traded between a seller and a buyer. A computer program product can be distributed in the form of a storage medium that is readable by machines (e.g., a compact disc read only memory (CD-ROM)), or may be distributed through an application store (e.g., Play Store™) or distributed directly between two user devices (e.g., smartphones), and distributed on-line (e.g., download or upload). In the case of on-line distribution, at least a portion of a computer program product may be stored in a storage medium such as the server of the manufacturer, the server of the application store, and the memory of the relay server at least temporarily, or may be generated temporarily.

While embodiments of the disclosure have been shown and described, the disclosure is not limited to the aforementioned specific embodiments, and various modifications can be made by those having ordinary skill in the art to which the disclosure belongs, without departing from the gist of the disclosure as claimed by the appended claims. Also, it is intended that such modifications are not to be interpreted independently from the technical idea or prospect of the disclosure.

What is claimed is:

1. A display apparatus comprising:
   a display configured to be rotatable;
   a plurality of cameras including a first camera and a second camera; and
   a processor configured to:
      while the display is oriented in a vertical direction, control the first camera of the plurality of cameras to perform photographing to obtain a first image,
      identify first feature data from the first image,
      based on a user command being received while the first camera is performing photographing, rotate the display to be oriented in a horizontal direction,
      after an orientation of the display apparatus is changed from the vertical direction to the horizontal direction, remain the first camera to perform photographing to obtain a second image,
      identify second feature data from the second image,
      based on identifying that the second feature data corresponds to the first feature data, control the first camera to continuously perform photographing, and
      based on identifying that the second feature data does not correspond to the first feature data, control the first camera to stop photographing, and control the second camera to perform photographing,
   wherein the second camera has an angle of view that is greater than an angle of view of the first camera,
   wherein the processor controls the plurality of cameras by selectively operating any one of the first camera and the second camera.

2. The display apparatus of claim 1, wherein the processor is further configured to:
   identify an object included in the first image and identify the object included in the second image, and
   based on identifying the object in both the first image and the second image, control the display to display the second image such that the object is displayed in a center area of the display oriented in the horizontal direction.

3. The display apparatus of claim 1, further comprising:
a sensor,
wherein the processor is further configured to:
identify a tilting angle of the display based on sensing data obtained from the sensor while the display is oriented in the vertical direction, and
rotate a first photographing angle of the first camera based on the tilting angle.

4. The display apparatus of claim 3, wherein the processor is further configured to:
rotate the first photographing angle of the first camera in a lower direction by the tilting angle.

5. The display apparatus of claim 3, wherein the processor is further configured to:
based on the display rotating to be oriented in the horizontal direction according to the user command, identify the tilting angle of the display based on the sensing data received from the sensor, and rotate a second photographing angle of the second camera based on the tilting angle.

6. The display apparatus according to claim 3, wherein the tilting angle is an angle between a surface of the display and a plane perpendicular to a ground.

7. The display apparatus according to claim 1, wherein the user command comprises at least one of a user input for rotating the display or a user input for controlling the display to display a broadcasting signal received from an external device.

8. The display apparatus according to claim 1, further comprising:
a motor configured to rotate the display to be oriented in the vertical direction and the horizontal direction.

9. The display apparatus according to claim 1, wherein the processor is further configured to rotate the display based on a function being executed by the display.

10. The display apparatus according to claim 9, wherein the function comprises at least one of a video call, a broadcasting, or a gaming.

11. A control method of a display apparatus including a rotatable display, the method comprising:
while the display is oriented in a vertical direction, controlling a first camera of a plurality of cameras included in the display apparatus to perform photographing to obtain a first image;
identifying first feature data from the first image;
based on a user command being received while the first camera is performing photographing, rotating the display to be oriented in a horizontal direction;
after an orientation of the display apparatus is changed from the vertical direction to the horizontal direction, remaining the first camera to perform photographing to obtain a second image;
identifying second feature data from the second image;
based on a result of the identification, controlling the plurality of cameras, wherein the controlling the plurality of cameras comprises, based on identifying that the second feature data corresponds to the first feature data, controlling the first camera to continuously perform photographing; and
based on identifying that the second feature data does not correspond to the first feature data, controlling the first camera to stop photographing, and controlling a second camera of the plurality of cameras to perform photographing,
wherein the second camera has an angle of view that is greater than an angle of view of the first camera,
wherein the controlling comprises controlling the plurality of cameras by selectively operating any one of the first camera and the second camera.

12. The control method of claim 11, further comprising:
identifying an object included in the first image and identifying the object included in the second image; and
based on identifying the object in both the first image and the second image, controlling the display to displaying the second image such that the object is displayed in a center area of the display oriented in the horizontal direction.

13. The control method of claim 11, further comprising:
identifying, by a sensor, a tilting angle of the display based on sensing data obtained from the sensor while the display is oriented in the vertical direction; and
rotating a first photographing angle of the first camera based on the tilting angle.

14. The control method of claim 13, wherein the rotating the first photographing angle of the first camera further comprises:
rotating the first photographing angle of the first camera in a lower direction by the tilting angle.

15. The control method of claim 13, further comprising:
based on the display rotating to be oriented in the horizontal direction according to the user command, identifying the tilting angle of the display based on the sensing data received from the sensor; and
rotating a second photographing angle of the second camera based on the tilting angle.

16. A display apparatus comprising:
a display configured to be rotatable;
a plurality of cameras; and
a processor configured to:
based on the display being in a first orientation, control a first camera of the plurality of cameras to perform photographing;
based on a user command being received while the first camera is performing photographing, identify first feature data based on a first image obtained in the first orientation, rotate the display to be in a second orientation,
after an orientation of the display apparatus is changed from the first orientation to the second orientation, remain the first camera to perform photographing;
identify second feature data based on a second image obtained in the second orientation,
based on identifying that the second feature data corresponds to the first feature data, control the first camera to continuously perform photographing;
based on identifying that the second feature data does not correspond to the first feature data, control the first camera to stop photographing, and control a second camera to perform photographing, and
wherein the second camera has an angle of view that is greater than an angle of view of the first camera, and
wherein the processor controls the plurality of cameras by selectively operating any one of the first camera and the second camera.

\* \* \* \* \*